United States Patent [19]

Werth

[11] 4,349,614
[45] Sep. 14, 1982

[54] PLATINUM THIRD ELECTRODE TO IMPROVE FLOAT POLARIZATION OF STANDBY BATTERIES

[75] Inventor: John Werth, Princeton, N.J.

[73] Assignee: Exide Corporation, Philadelphia, Pa.

[21] Appl. No.: 241,088

[22] Filed: Mar. 6, 1981

[51] Int. Cl.$^3$ .......................................... H01M 10/44
[52] U.S. Cl. ...................................... 429/50; 429/225
[58] Field of Search ................................... 429/50–52, 429/59, 60, 225–228

[56] References Cited

U.S. PATENT DOCUMENTS

| | | | |
|---|---|---|---|
| 2,104,973 | 1/1938 | Dassler | 429/59 |
| 3,080,440 | 3/1963 | Ruetschi et al. | 136/3 |
| 3,658,591 | 4/1972 | Fukuda | 136/3 |
| 3,904,434 | 9/1975 | Sekido et al. | 429/59 |
| 4,086,392 | 4/1978 | Mao et al. | 429/50 |
| 4,143,212 | 3/1979 | Ueno et al. | 429/7 |

*Primary Examiner*—Charles F. Lefevour
*Attorney, Agent, or Firm*—Raymond J. Kenny; Ewan C. MacQueen

[57] ABSTRACT

An auxiliary electrode of platinum or palladium is immersed in the electrolyte of a lead-acid battery and connected to the negative plate of the battery so that, when the battery is employed in float service, hydrogen evolves on the auxiliary electrode whereby the parasitic current equivalent to the hydrogen evolution increases the float current to the positive plate of the battery.

3 Claims, No Drawings

PLATINUM THIRD ELECTRODE TO IMPROVE FLOAT POLARIZATION OF STANDBY BATTERIES

It is known that an important application for lead-acid industrial batteries is in stand-by service to insure an uninterrupted current supply for the operation of control and protective equipment as well as for signal operations, emergency lighting, circuit-breaker control, computer power supply, and the like. In such applications, the batteries are continuously connected to a bus from the primary power supply, with the voltage of the charging line being slightly greater than the open-circuit voltage of the battery and opposite in polarity.

Batteries so employed are seldom required to discharge much of their capacity and they are maintained in a charged condition by "floating" across a voltage-controlled circuit having a voltage in the range of about 2.14 volts per cell to 2.18 volts per cell.

It is of course necessary that the batteries on float be capable of delivering full capacity discharge at any time. The batteries are expensive and are intended to be utilized in float service for lengthy time periods, e.g., years.

It is important that cells used on standby duty operate within the proper range of float polarization voltages at both the positive and negative plates. If the positive polarization voltage is too low, the cell will not hold its charge; if it is too high, the positive may corrode. If the negative polarization is too high (usually due to hydrogen gas retention in the pores), not enough voltage is available for the positive polarization, and the cell will lose its charge. If the negative polarization is too low, the positive polarization may be too high; and the positive may corrode. If too much gas gets trapped in the pores of the negative and cannot escape, the ability to deliver a large current on emergency discharge will be impaired.

One fix which has been employed in relation to float service batteries has been the introduction of a platinum salt into the electrolyte. This practice has been reputedly effective, but is an irreversible step susceptible to future problems and does not act fast enough when applied to batteries already in the field.

The invention comprises a simple, effective and reversible solution to uneven float polarization voltages of lead-acid cells and comprises immersing in the cell electrolyte a small foil of platinized platinum electrically connected to the negative plate of the cell as an auxiliary electrode. Palladium may be employed in place of platinum. The lead wire connecting the platinized platinum to the negative plate may include a variable resistor. The auxiliary electrode acts essentially as a negative plate depolarizer and hence the area thereof is not critical and may be varied over wide limits while retaining the same function. Foil electrodes having an area as little as one square millimeter and a thickness of 0.001 inch have been operative, although electrodes having an area of 2 square centimeters or even up to 10 square centimeters could be used. The cost of platinum, of course, militates in the direction of small electrodes.

The auxiliary electrode device draws a small parasitic current from the negative plate, evolving a commensurate amount of hydrogen at the surface of the platinum foil. This increases the float current at any voltage by an amount roughly equal to the parasitic current. That, in turn, allows the positive to catch up with the negative and to reach full charge regardless of how far the capacity of the positive may have fallen below that of the negative. The device thus allows the positive to reach full charge—no lead sulfate crystals—while the cells are on float service, instead of before.

As the positive generates more oxygen due to the higher float current, and as most of all of the hydrogen gas evolves on the platinum foil instead of within the pores of the negative, the bubbles trapped in the negative can escape, allowing for a high-rate discharge when needed. The optional variable resistor permits adjusting the parasitic current to any value from zero to about 200 mA and lets the adjuster apportion the positive and negative polarizations any way he chooses.

The platinum electrode technique avoids the irreversible aspects and possible future troubles of platinum-dosing an entire cell. Its controllability provides flexibility and insurance against future mismatches between cells. The fact that it allows cells to be immediately floated removes the competitive disadvantage of the pre-charge method.

The parasitic current allows a relatively large float current to charge the positive and to keep its polarization at the desired levels. At the same time, only part of the float current flows through the negative plates; the rest flows through the platinum foil. The net result is that practically all of the negative plate current is oxygen-supported. The hydrogen evolution current is almost entirely localized at the platinum foil. Thus hydrogen bubbles are prevented from clogging the negative and reducing its high-rate discharge capability.

The use of the series resistor allows for instant adjustment of cells which may in the future deviate from an optimum apportionment between positive and negative polarization. If production cells are reasonably uniform, the resistor can be left out. If it should later turn out that a better solution becomes available, the entire platinum electrode can be removed from the cell in seconds.

Mechanical implementation is relatively straightforward. If the resistor is left out, all that is needed is a lead or other suitable holder for the platinum or palladium foil. The lead holder (wire, strip or other shape) can be held up by the cap over the negative withdrawal tube hole or by any other suitable cap, plug, or lid. The other end of the lead holder is allowed to contact the negative strap or some other part of the negative. If a resistor is used, it can be encapsulated in a polymer and still kept below the cell cover. One side of the resistor goes to a lead wire that contacts the negative; the other side hangs in the electrolyte and holds the platinum or palladium foil submerged. The device can also have an external connection to the negative post. The platinum or palladium can be coated on an inexpensive substrate such as cadmium foil, for example. Other mechanical embodiments, most of which will be obvious to those skilled in the art of batteries and mechanical design, can be used to implement the concept.

EXAMPLE

A cell which had become imbalanced in float service was found to have low positive and high negative polarization with development of sulfate crystals at the positive. The positive plate was 12 inches high, 14 inches wide and $\frac{1}{4}$ inch thick. An overnight charge still left crystals at the positive but the electrolyte level rose about $\frac{1}{2}$-inch due to hydrogen bubbles retained in the pores of the negative. A one millimeter square platinum foil was inserted into the cell through the hole provided for the negative withdrawal tube and was connected by a lead wire to the negative through a trim-pot. The resulting parasitic current was measured with a milliammeter and the trim-pot was used to limit the current. The negative and positive polarizations were instantly reapportioned, with the positive rising to about 50 mV and the negative falling to about 60 mV. The float voltage was fixed at 2.17 volts. The parasitic current was set initially at 100 mA, but was later raised to about 200 mA. Positive polarization moved to 72 mV and negative polarization to 38 mV, with a decrease in the number of crystals at the positive and a steady fall in the electrolyte level over five days, indicating early full charge of the positive and freedom of the negative from hydrogen gas bubbles.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

The embodiments of the invention in which an exclusive property or privilege is claimed are defined as follows:

1. The method of maintaining float polarization voltages at both positive and negative plates of a lead-acid cell used on standby service within the proper range, which comprises establishing a cell having at least one positive plate and at least one negative plate immersed in electrolyte, immersing completely an auxiliary depolarizing platinum electrode in the cell electrolyte, connecting said electrode in the cell electrolyte, connecting said electrode electrically to the negative plate in the cell whereby hydrogen evolves on said electrode due to the float current, the parasitic current commensurate with said hydrogen evolution increasing the float current to the positive plate in said cell, enabling said positive plate to reach full charge while on float service.

2. The method according to claim 1 wherein a resistor is connected between said electrode and said negative plate.

3. A lead-acid cell having a positive and a negative plate immersed in the cell electrolyte and having a platinum or palladium auxiliary depolarizing electrode immersed completely in the cell electrolyte and electrically connected to said negative plate, employing said cell in float service with hydrogen evolving from said electrode.

* * * * *